(12) United States Patent
Lee

(10) Patent No.: US 6,952,219 B2
(45) Date of Patent: Oct. 4, 2005

(54) SYSTEM AND METHOD FOR COLOR-CODING OBJECTS HAVING MULTIPLE ATTRIBUTES

(75) Inventor: Juhnyoung Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 09/848,425

(22) Filed: May 4, 2001

(65) Prior Publication Data

US 2002/0171662 A1 Nov. 21, 2002

(51) Int. Cl.⁷ .............................. G09G 5/02; G06T 11/20
(52) U.S. Cl. .................................... 345/593; 345/440
(58) Field of Search ................................ 345/962, 967, 345/968, 593, 594, 619, 440; 705/10, 1, 28, 16, 26

(56) References Cited

U.S. PATENT DOCUMENTS

| | | | | |
|---|---|---|---|---|
| 5,999,650 A | * | 12/1999 | Ligon | 382/191 |
| 6,237,006 B1 | * | 5/2001 | Weinberg et al. | 707/103 R |
| 6,480,194 B1 | * | 11/2002 | Sang'udi et al | 345/440 |
| 6,529,892 B1 | * | 3/2003 | Lambert | 706/55 |
| 2002/0016759 A1 | * | 2/2002 | Macready et al. | 705/37 |
| 2002/0055897 A1 | * | 5/2002 | Shidler et al. | 705/35 |
| 2002/0122587 A1 | * | 9/2002 | Lim et al. | 382/165 |
| 2003/0044062 A1 | * | 3/2003 | Ganapathy et al. | 382/165 |
| 2003/0063779 A1 | * | 4/2003 | Wrigley | 382/116 |
| 2003/0088458 A1 | * | 5/2003 | Afeyan et al. | 705/10 |

* cited by examiner

Primary Examiner—Richard Hjerpe
Assistant Examiner—Faranak Fouladi
(74) Attorney, Agent, or Firm—McGuireWoods LLP; Stephen C. Kaufman

(57) ABSTRACT

An improved method effectively uses colors to graphically represent objects having multiple attributes in computers. Objects having multiple attributes in computer programs involving objects having multiple attributes, such as a computer program automating an RFQ (Request for Quote) process, are represented in a structured way that assigns a color to an object by taking into account attribute values of the object.

19 Claims, 8 Drawing Sheets (3 of 8 Drawing Sheet(s) Filed in Color)

Blue palette

Brown palette

Gray palette

Green palette

Orange palette

Pink palette

Red palette

Violet palette

Yellow palette

SYSTEM AND METHOD FOR COLOR-CODING OBJECTS HAVING MULTIPLE ATTRIBUTES

CROSS REFERENCE TO RELATED APPLICATION

The invention described in this application is related in subject matter to the disclosure in copending patent application Ser. No. 09/723,236 filed Nov. 28, 2000, by Ho Soo Lee and Juhyoung Lee for "Method and Visual Interface For Evaluating Multi-Attribute Bids In A Network Environment" and assigned to a common assignee herewith. The disclosure of application Ser. No. 09/723,236 is incorporated herein by reference.

BACKGROUND OF THE INVENTION

1. Field of the Invention

This invention relates to graphical representation of objects in computers. More specifically, the invention relates to the use of colors for graphically representing objects that have multiple attributes. A possible application of this invention is a graphical user interface (GUI) for business applications that involve using objects that have multiple attributes.

2. Background Description

Graphical user interfaces in computers graphically represent objects in computer screens and provide various visual facilities which computer users can utilizes to manage the objects in computers, mostly by using pointing devices such as mouse. Thanks to its ease-of-use compared to the command-line interface, graphical user interfaces have gained popularity since first introduced in 1970's, and have been used in various computer programs in various situations. Also, diverse visual facilities have been studied and developed for graphical user interfaces.

One problem with the prior art is that the use of color in graphical representation of objects in application programs is not effective. It does not use colors at all in graphical representation of objects. Or when it uses colors for the purpose, it uses them in an unstructured way. That is, the user cannot connect the color of a sell bid object with any of its attribute values.

SUMMARY OF THE INVENTION

It is therefore an object of the present invention to provide an improved method for using colors in graphically representing objects having multiple attributes in computers.

Another object of this invention is to provide an improved method for using colors in graphically representing objects having multiple attributes in computers that is used in graphical user interfaces of computer programs involving objects having multiple attributes, such as a computer program automating an RFQ (Request for Quote) process.

Another object of this invention is to provide an improved method for using colors in graphically representing objects having multiple attributes in computers that is used in graphical user interfaces of computer programs involving objects having multiple attributes, such as a computer program automating an RFQ process, and at the same time providing a structured way to assign a color to an object by taking into account attribute values of the object.

This invention relates to the use of colors for graphically representing objects having multiple attributes in graphical user interfaces. The selection of a color for an object will take into account the attribute values of the object. This invention is useful in application programs that involve using objects having multiple attributes. Many business application programs used by organizations have this characteristic. For example, a sell bid or Offer-To-Sells (OTS) from suppliers submitted to a Request-For-Quote (RFQ) has multiple number of attributes. RFQ is a type of reverse auction where a request is submitted by a buyer to an electronic marketplace to invite potential sellers to bid on specific products or services needed by the buyer's organization. A bid may have attributes related to the product specification such as price, material quality and properties, color and size. In addition, there may be attributes related to the service specification such as delivery time and cost, and warranty. Furthermore, there may be supplier qualification attributes such as delivery experience and reputation.

Copending patent application Ser. No. 09/723,236 entitled "Method and Visual Interface For Evaluating Multi-Attribute Bids In A Network Environment," discloses a graphical user interface and a number of visual facilities on it which are useful for a business application program assisting buyers in an RFQ process to evaluate and compare submitted sell bids that have multiple attributes. This invention addresses the use of colors for displaying sell bid objects in the visual interface presented in the previous patent. Other prior work in business application programs that help buyers in an RFQ process uses a bid-scoring function based on multi-criteria decision analysis techniques which are basically a sophisticated way to compute weighted average of multiple attribute values of bids.

In one aspect of the present invention a computer system is provided for using colors to graphically represent objects in computer screens. The system includes an object module which provides one or more objects each having attribute values and a distance calculator that calculates distances among the one or more objects and a target object. A color mapping module is further provided which assigns a color to the one or more objects based on the distance between the one or more objects and the target object. The assigned color being closer to one or more predetermined set of colors of the target object at a closer distance to the target object. An object rendering module graphically displays the one or more objects by using the colors assigned thereto. In embodiments, an object grouping module creates one or more object groups from the one or more objects based on the attribute values of the objects when a number of objects is greater than an available number of colors. Also, a group mapping module assigns a color group to each of the one or more object groups based on the distance between the target object and the one or more object groups.

In another aspect of the present invention a method of using colors is provided to graphically represent objects having multiple attributes in a computer. The method may be implemented via a machine readable medium containing code. In the method, one or more objects each having attribute values is provided. Distances are calculated among the one or more objects and a target object. The method further assigns a color to the one or more objects based on the distance between the one or more objects and the target object. The results are graphically displayed via the assigned colors.

BRIEF DESCRIPTION OF THE DRAWINGS

The file of this patent contains at least one drawing executed in color. Copies of this patent with the color drawings will be provided by the U.S. Patent and Trademark Office upon request and payment of the necessary fee.

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Copending patent application Ser. No. 09/723,236 entitled "Method and Visual Interface For Evaluating Multi-Attribute Bids In A Network Environment" provides a graphical user interface and a number of visual facilities on it which are useful for a business application program assisting buyers in an RFQ process to evaluate and compare submitted sell bids that have multiple attributes. The color-coding scheme of multi-attribute objects presented in this invention is assumed to be used in conjunction with the graphical user interface presented in application Ser. No. 09/723,236.

Figure 1:
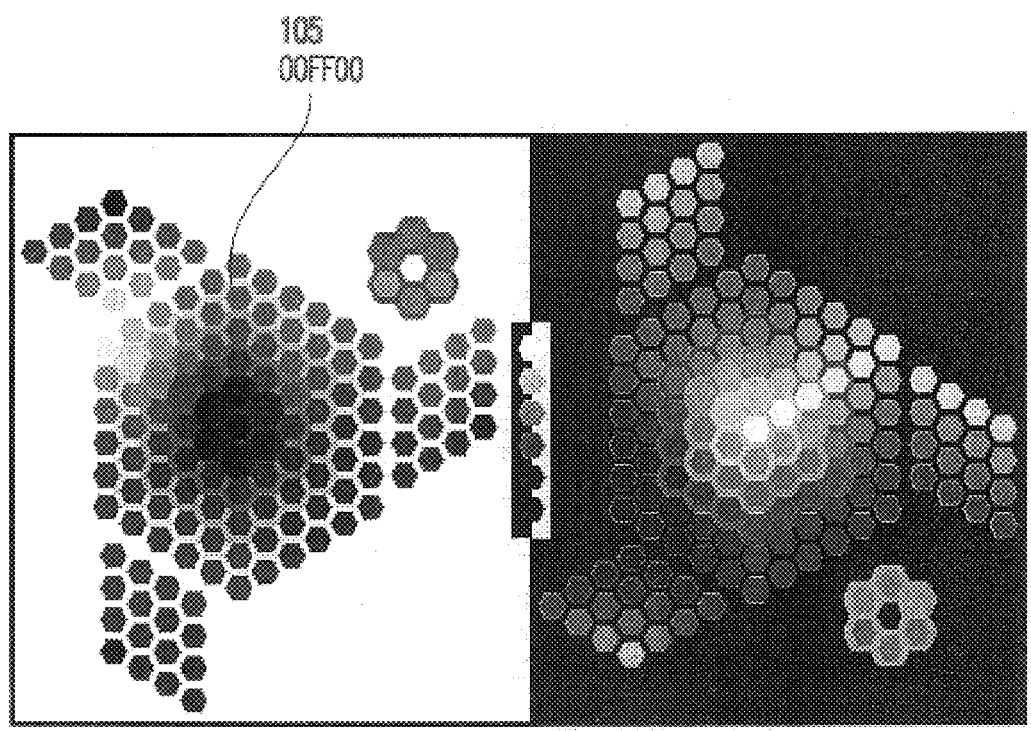
FIG. 1 is a set of colors available in most computers.

Referring now to the drawings, and more particularly to FIG. 1, there is shown a set of 216 colors that are available in most computers. Some computers can be tuned to display more than 216 colors, but the colors shown in FIG. 1 are the ones which can be safely used in most computers. In this detailed description, this set of colors for objects is used in business applications. Every color is coded as a composite string containing three values. These values specify the amount of red, green and blue light to be emitted from a certain tiny portion of the screen. The general form of color code is RRGGBB; a triplet of two-digit numbers where R is red, G is green and B is blue. Often the two-digits are expressed in hexadecimal numbers. For example, the green color 105 in FIG. 1 has the code 00FF00. There are only six possible values available for "safe" color code: 00, 33, 66, 99, CC, and FF. Thus, the present invention utilizes color codes that are three-way permutations of the set (00, 33, 66, 99, CC, FF), i.e., 6×6×6=216 colors.

Figure 2:
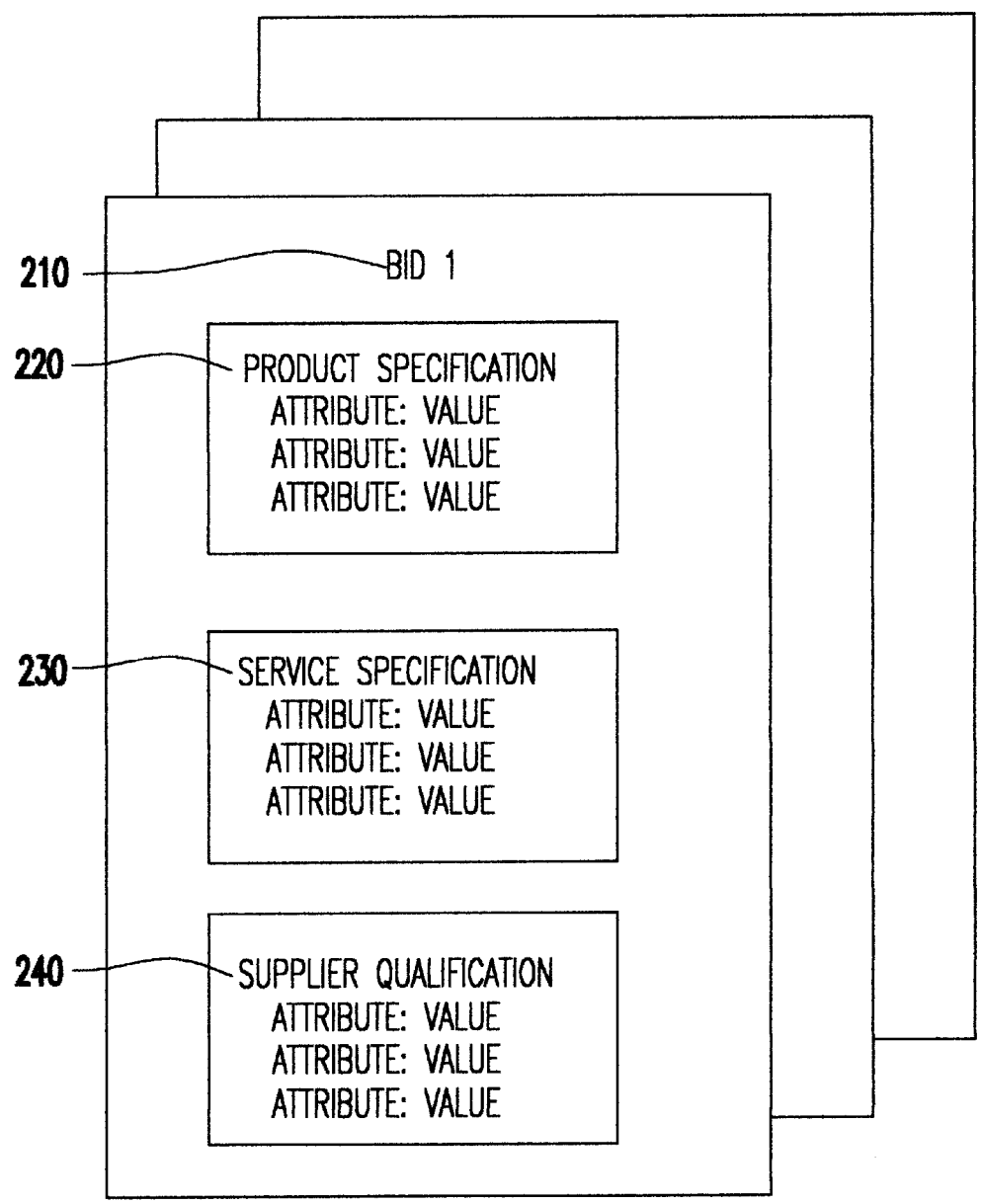
FIG. 2 is a block diagram illustrating bids having multiple attributes.

FIG. 2 shows sell bids having multiple attributes as an example of objects in business applications. A bid 210 can have attributes related to the product specification 220, such as price, material quality and properties, color and size. In addition, there may be attributes related to the service specification 230, such as delivery time and cost, and warranty. Furthermore, there may be supplier qualification 240, attributes such as delivery experience and reputation.

Figure 3:
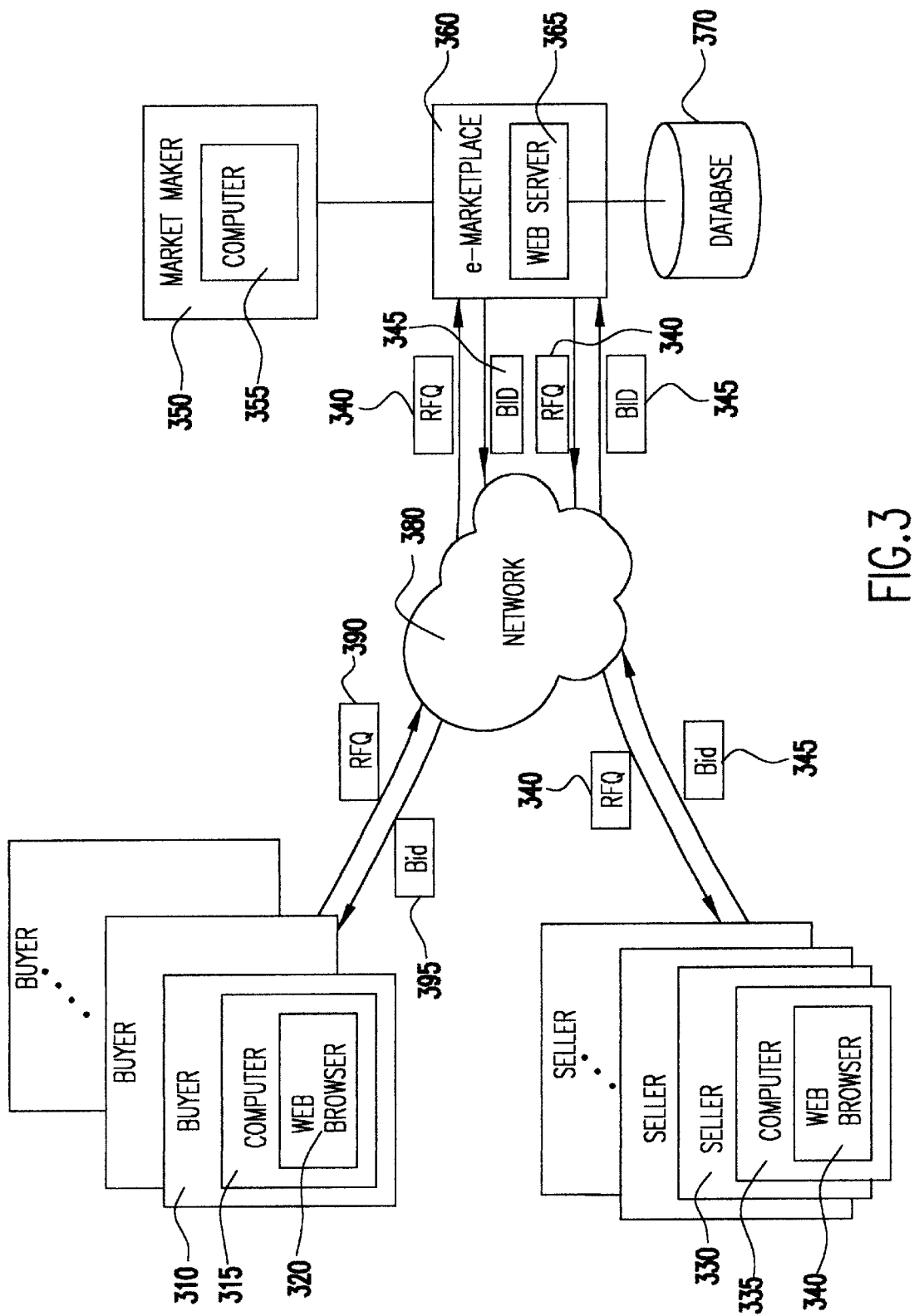
FIG. 3 is a block diagram illustrating a system architecture of an electronic marketplace in accordance with the present invention.

FIG. 3 shows a system architecture of an electronic marketplace showing one or more buyers 310, one or more computers 315 used by the buyers 310, one or more Web browser programs 320 used by the buyers 310, one or more sellers 330, one or more computers 335 used by the sellers 330, one or more Web browser programs 340 used by the sellers 330, one or more market makers 350, one or more computers 355 used by the market makers 350, one or more e-marketplaces 360 operated by the market makers 350, one or more Web server systems 365 of the e-marketplaces 360, one or more database systems 370 of the e-marketplaces 360, a computer network 380, one or more RFQs 390 submitted to the e-marketplaces 360 by one or more buyers 310, and one or more sell bids 395 submitted to the e-marketplaces 360 by one or more sellers 330.

An e-marketplace 360 is preferably implemented with a Web server system 365 and stores data about trading including product catalogs, information about buyers and sellers, and information about various markets in a database system 370. This invention specifically relates to the RFQ process among various trading mechanisms in electronic marketplaces. In a RFQ process, a buyer 310 submits an RFQ 390 to an e-marketplace 360 by using his/her Web browser program 340 running on his/her computer 315. The Web server system 365 of the e-marketplace 360 receives the RFQ 390 and post it as a new market in the e-marketplace 360. One or more sellers 330 who finds the posted RFQ interesting submit one or more sell bids 395 to the e-marketplace 360 by using his/her Web browser program 340 running on his/her computer 335. The buyer 310 who made the RFQ 390 selects winners among the submitted sell bids 395. For communication, Web browser programs 320 and 340 of sellers and buyers and Web server system 365 of the market maker 350 typically use HTTP (HyperText Transfer Protocol) which is a network protocol defined for that purpose.

Figure 4:
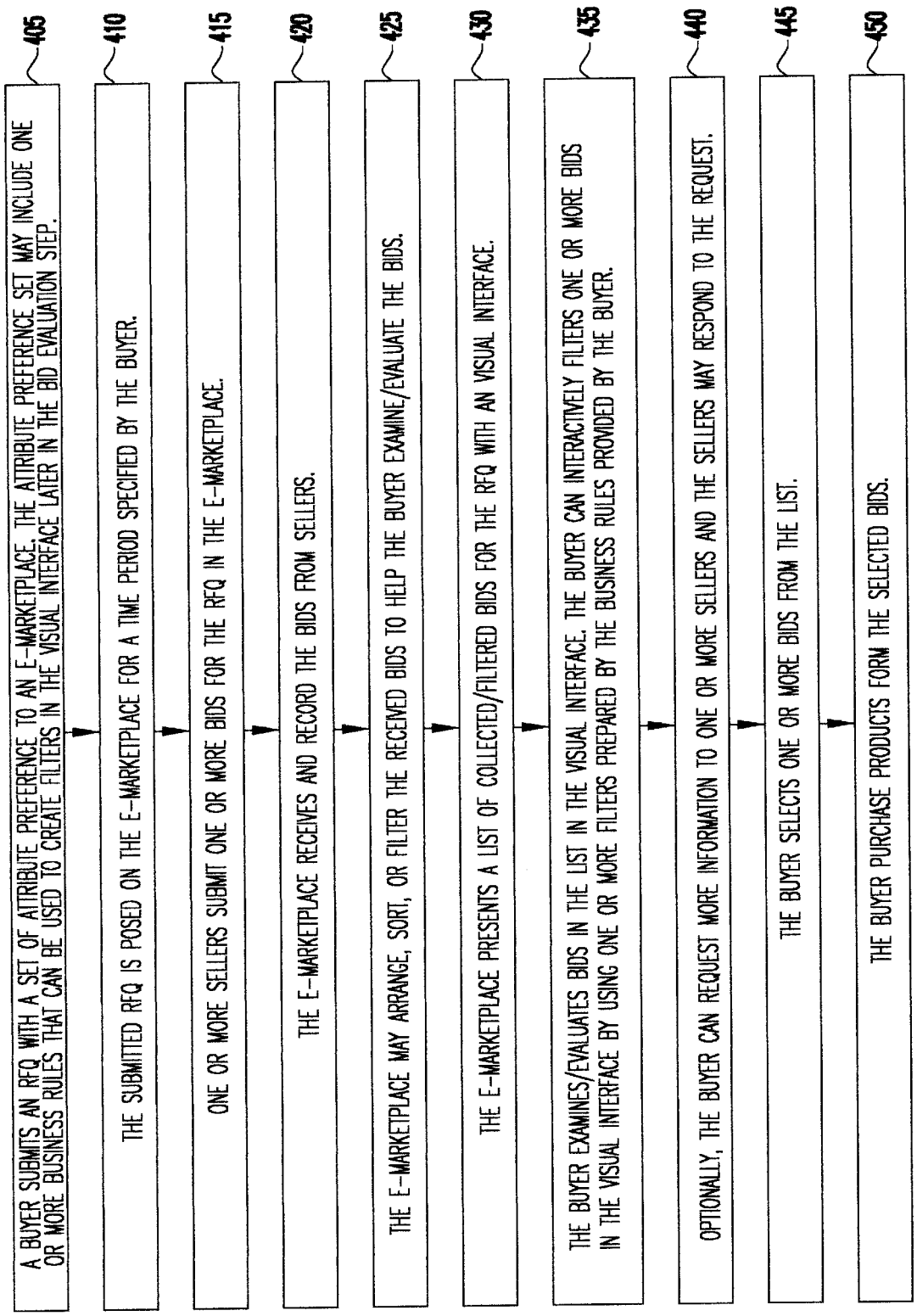
FIG. 4 is a flow chart of a RFQ process using a visual interface in accordance with the present invention.

FIG. 4 is a flow chart of a preferred RFQ process using a visual interface. As the first step 405, a buyer 310 submits an RFQ 390 for one or more products or services with a set of attribute preference to an e-marketplace 360. The attribute preference include product attributes and other relevant factors including price, quantity, material quality, product quality ratings, merchant reputation, warranty, support, delivery time, and delivery cost. The attribute preference submitted by the buyer 310 will be used later for evaluating received sell bids by the market maker 350. Also, the buyer 310 is allowed to specify a criterion for the termination of the RFQ, typically in a form of time and date for termination. To help buyers specify all this information about an RFQ and also to automate the matching process of an RFQ and submitted sell bids, the market maker 350 of the e-marketplace 360 may provide a structured form (as one or more Web pages) for all the data entries described above. Also, the market maker 350 stores the submitted information about the RFQ 390 in the database system 370 of the e-marketplace 360.

At this step 405, the buyer 310 of the RFQ 390 can provide one or more business rules as part of the attribute preference set which describes the buyer's preference for various relevant factors including price, quantity, volume discount policy, material quality, product quality ratings, merchant reputation, warranty, support, delivery time, and delivery cost. Business rules specify one or more constraints on one or more attributes of the product or service. Also, business rules express various relationship among attributes of products or services. For example, the buyer 310 can have a business rule describing that the buyer is willing to pay $100 more if a seller can deliver the product of interest overnight while other conditions are the same. This particular business rule specifies a relationship between price and delivery time. Business rules specified by the buyer 310 at this step 405 will be used at a later step 430 by the market maker 350 to create a visual interface 700 augmented by customized filters of business rules for the buyer 310.

As the next step 410, the submitted RFQ 390 is posted on the e-marketplace 360 for a time period specified by the buyer 310 inviting bids from sellers 330 of the particular products or services specified in the RFQ 390. The attribute preference of the RFQ 390 mayor may not be revealed to potential sellers in the e-marketplace depending on market type. In some cases, some of the attribute preference are posted while others are not. As the next step 415, one or more sellers 330 respond to the RFQ by submitting bids to the e-marketplace 360. The sellers 330 also specify various relevant factors in their bids including price, quantity, volume discount policy, material quality, product quality ratings, merchant reputation, warranty, support, delivery time, and delivery cost. Again, to help sellers specify properties of their bids and also to automate the matching process of an RFQ and submitted bids, the market maker 350 of the e-marketplace 360 may provide a structured form (as one or more Web pages) for all the data entries. Also, at step 420, the market maker 350 stores the information about the submitted sell bids 395 in the database system 370 of the e-marketplace 360.

When the RFQ 390 is terminated by the criterion specified by the buyer 310, the market maker 350 of the e-marketplace 360 retrieves the RFQ and sell bids from the database system 370 and examines them, either manually or by using one or more computer tools. The market maker 350 allows the buyer 310 to examine this raw data and to select winners among the submitted sell bids. Or, optionally 425, the market maker 350 process submitted sell bids 395 before presenting them to the buyer 310. For example, the market maker 350 may filter out bids that do not meet anyone or more of the attribute preference specified by the buyer 310. Also, the market maker 350 may rank and sort the sell bids by score that is calculated by using one or more scoring algorithms.

At the next step 430, the market maker 350 of the e-marketplace 360 creates a visual interface (shown in FIG. 7) customized for individual RFQs showing all the attributes of the RFQ 390 and their values of individual sell bids 395 in a single screen. Business rules specified by the buyer 310 at step 405 are also augmented in the visual interface in a form of dynamic filters. At the next step 435, the buyer 310 can interactively select or de-select those filters representing one or more business rules to change the display of the given visual interface (FIG. 7) in an effort to compare sell bids 395 having different attribute values.

Optionally at step 440, the buyer 310 can request more information about one or more of the sell bids 395 in the visual interface. To help this information request process, the market make 350 may provide one or more hyperlinks for each bid to Web pages that provide more information about the bid. The buyer 310 only needs to click on the hyperlinks to read more information about the bid. In addition, the buyer 310 may request more information which is not readily available. For these cases, the market maker 350 may provide contact information including phone number, fax number, and/or email address of sellers. Furthermore, once the buyer 310 is connected to a seller 330 through a method suggested by the market maker 350, the buyer and seller can further negotiate about their bid in an effort to reach an agreement.

After finishing the evaluation of sell bids 395, at step 445, the buyer 310 selects one or more sell bids from the given list as winners. In some cases, it is possible that the buyer 310 does not select any bid as a winner. The buyer will be able to submit a new RFQ with a modified set of attribute preferences and modified market rules. However, this invention considers such a case a separate RFQ, and does not include in the preferred business process.

Finally in step 450, the buyer 310 purchases products or services from the selected sell bids. Typically, the sell bid list given by the market maker 350 provides a buy button for each bid in the list. To complete a transaction for a selected sell bid, the buyer 310 simply clicks on the buy button of the bid. It allows the buyer to provide necessary payment information for completing a transaction. In some cases, the buy button is connected with a shopping cart capability, so that the buyer 310 needs to provide the payment information only once for payment of two or more selected bids. If the buy button capability is not available from the market maker 350, the buyer 310 may need to resolve the issues of payment and product shipping directly with the seller 330.

Figure 5:
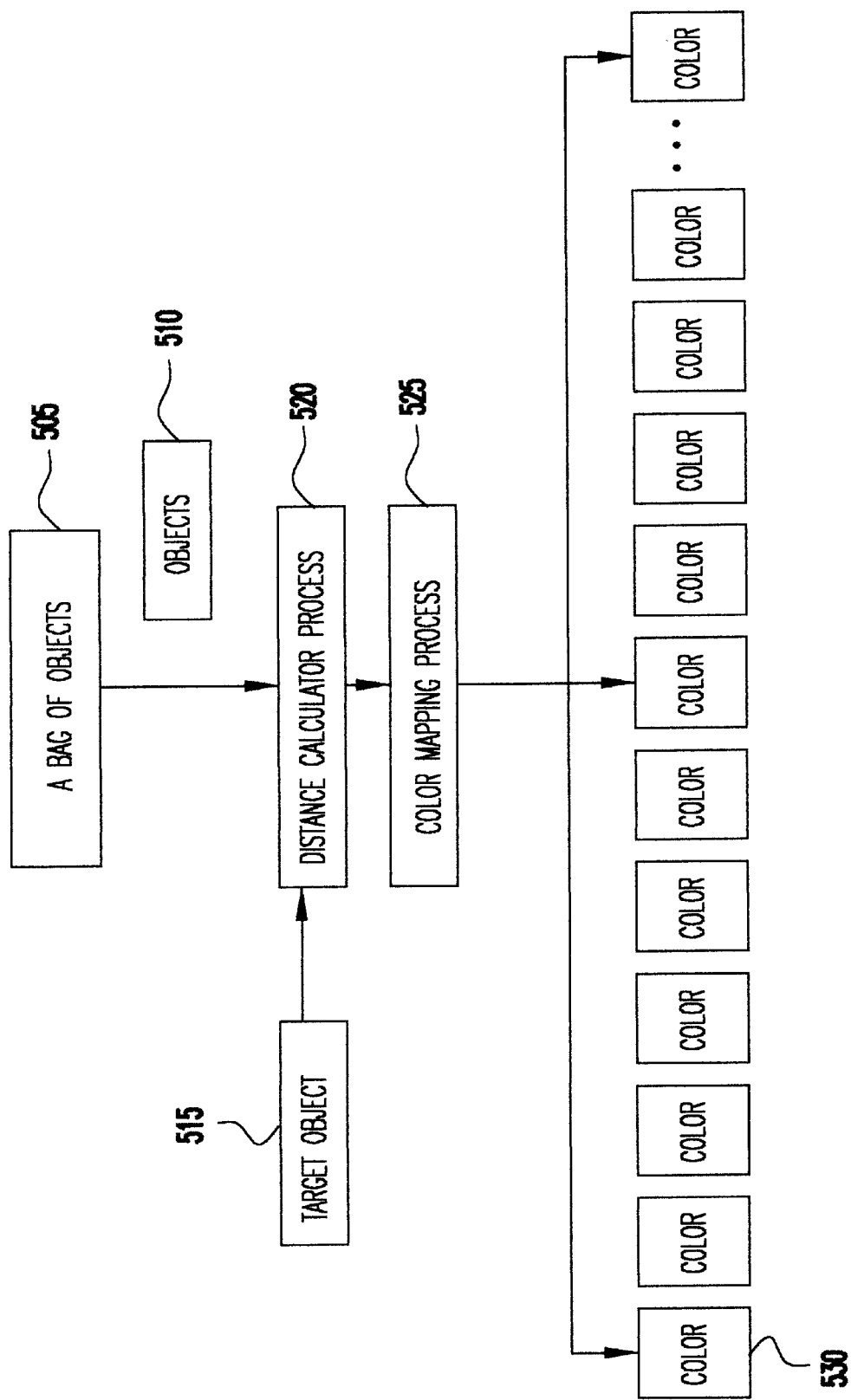
FIG. 5 is a block diagram of a system architecture of color coding in accordance with the present invention.

FIG. 5 is a system architecture of color coding used in accordance with the present invention. An input to the system is a set of objects which have multiple attributes used in a business application program. An example of such an object is a bid 210 shown in FIG. 2, which has a number of attributes for product and service specification and supplier qualification. The color-coding system receives objects one by one as the application program demands to display the object 510. Another input to the color-coding system is a target object 515. This object 515 has the same number and type of attributes as the objects from the bag 505, is assigned an initial color 530, and is used to provide a comparison point for other objects.

When receiving the object 510, the distance calculator process 520 calculates the distance between this object 510 and the target object 515 by using a distance formula. ("Process" or "processes" may be used interchangeably with "module" or "modules".) An example of the distance formula is as follows:

$$D_i = \frac{\sum_j w_j |a_{i,j} - a_{t,j}|}{N_j}, \text{ and}$$

$$N_j = \max_i (|a_{ij} - a_{tj}|)$$

$D_i$ denotes the distance of the object i from the target object. $w_j$ represents the weight of the attribute j. $a_{ij}$ and $a_{tj}$ denote the value of the attribute j for the object i and the target object, respectively. $N_j$ is the normalization factor for the attribute j. The distance of two objects is the sum of the weighted distances of individual attributes divided by the normalization factor. By using such a distance formula, it is now possible to have a quantitative measure which reasonably represents how similar or distinctive two objects are with relation to each other.

Still referring to FIG. 5, the color mapping process 525 assigns colors to objects based on this distance measure. That is, an object which has a small distance value will be assigned a color that is closer to the color assigned to the target object. Colors assigned to objects will represent the degree of distinction (or similarity) between objects. The distance is decided by attribute values of the objects. With this color-coding scheme based on attribute values, users can intuitively understand how similar or distinctive two objects are without actually examining the attribute values of the objects.

Figure 8:
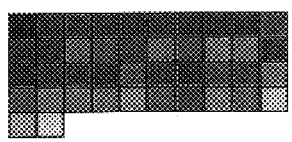
FIG. 8 shows groups of colors.
Figure 8:
Figure 8:
Figure 8:
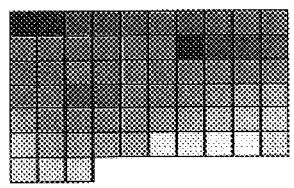
Figure 8:
Figure 8:
Figure 8:
Figure 8:
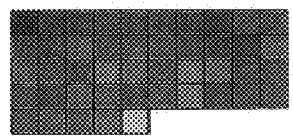
Figure 8:

If necessary, available colors in computers can be divided into several groups, e.g., a group of blue, brown, gray, green, orange, pink, red, violet, or yellow colors, as shown in FIG. 8. If the number of objects is only a few, one or more group of colors can be chosen and used for the objects. On the other hand, if the number of objects is more than 216, the number of the available colors, the objects can be grouped to fewer than 216 sets before the color mapping process (via a grouping module or process).

Figure 6:
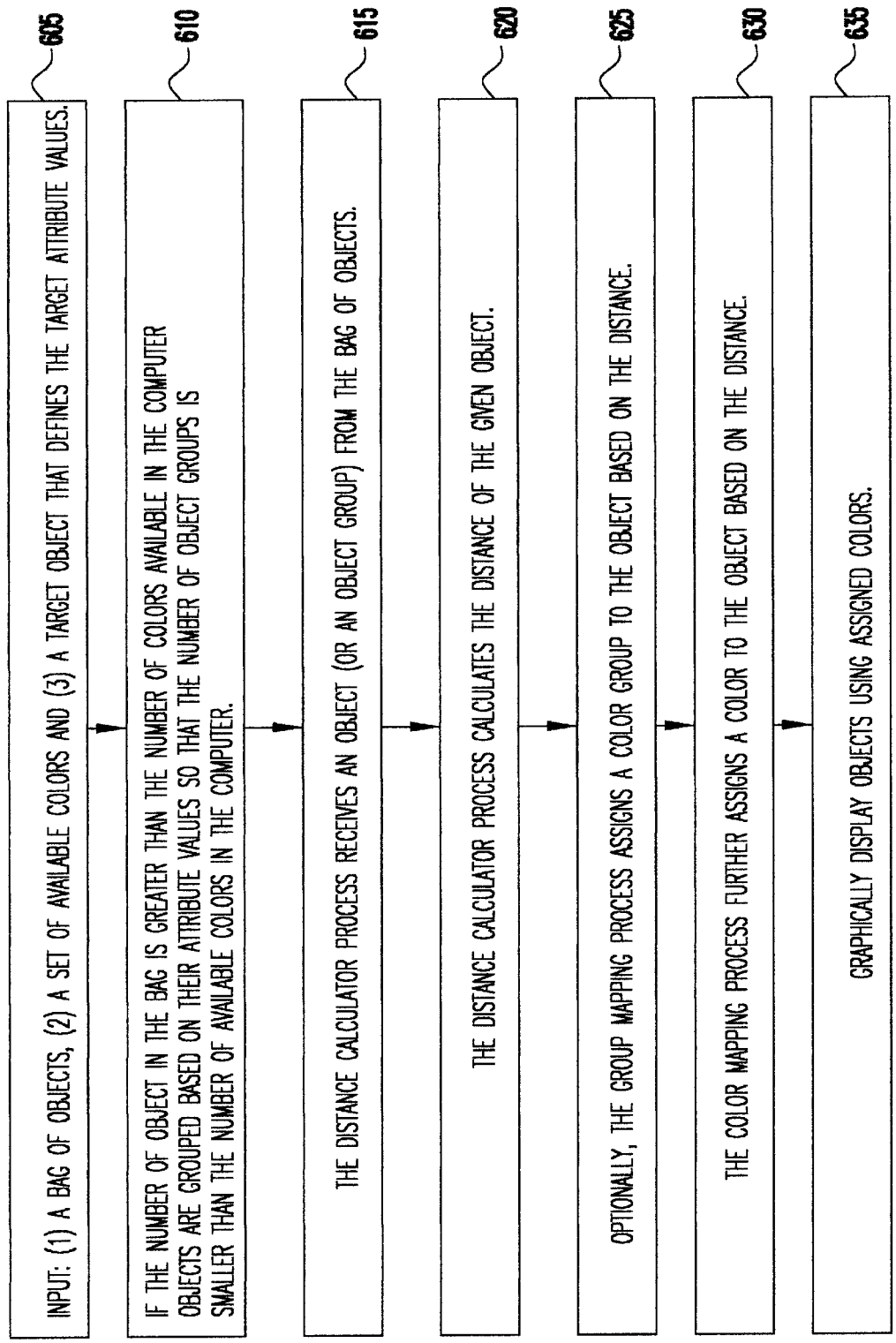
FIG. 6 is a flow chart of a color coding process in accordance with the present invention.

FIG. 6 is a flow chart of a color coding process. FIG. 6 may also represent a high level block diagram of the system of the present invention. As explained, and shown as step 605, the system is given three inputs: (1) a bag of objects, (2) a set of available colors which are assumed to be 216 colors available in most computers, and (3) a target object that defines the target attribute values. At the step 610, if the number of the given objects is greater than the number of available colors, the system groups the given objects based on their attribute values so that the number of object groups is smaller than the number of available colors. At step 615, the distance calculator process 520 receives an object (or an object group) from the input, and then in step 620, it calculates the distance of the given object by using the distance formula. Optionally, the group mapping process assigns a color group to the object based on the calculated distance in step 625. Finally, the color mapping process 525 further assigns a color to the object based on the distance in step 630. In step 635, the object rendering process graphically displays the objects using the assigned colors a shown in FIG. 7.

Figure 7:
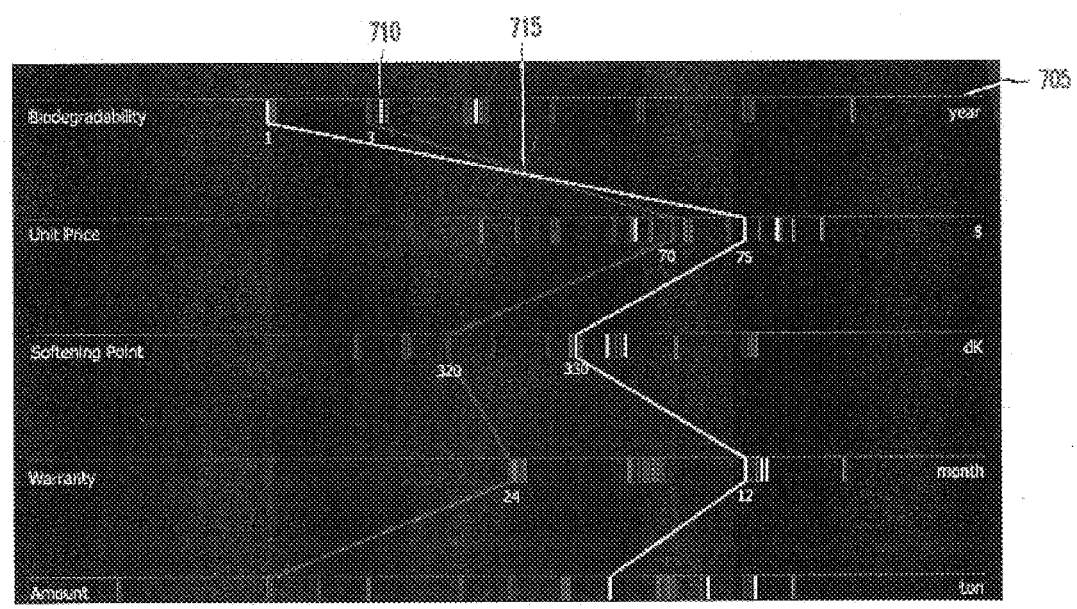
FIG. 7 is an example of color-coded bids in a visual interface.

FIG. 7 is an example of color-coded bids in a visual interface. The visual interface comprises a number of components: attribute lines 705, attribute value points 710, and object lines 715. An attribute line 705 represents an attribute of the given objects. Multiple attributes of objects are represented as multiple attribute lines in the visual interface. Each attribute line has its name on the left-hand side and its unit on the right-hand side under the line. An attribute value point 710 represents an attribute value of an object. It is coded by color chosen for the object. An object line 715 represents an objects by connecting all the attribute value points of the object. It is also coded by color assigned to the object. Colors assigned to objects will represent the degree of similarity between objects. With this color-coding scheme in the visual interface, users can intuitively understand how similar or distinctive two objects are without actually examining the attribute values of the objects.

While the invention has been described in terms of several embodiments, those skilled in the art will recognize that the invention can be practiced with modification within the spirit and scope of the appended claims.

I claim:

1. A computer system for using colors to graphically represent objects in computer screens, the system comprising:

an object module which provides one or more objects each having attribute values;

a distance calculator that calculates distances among the one or more objects and a target object and calculates a distance among two or more object groups, formed from the one or more objects, based on the attribute values of the one or more objects, the target object having one or more predetermined colors;

a graphic mapping module that assigns one of a color and a color group to the one or more objects based on the distance between the one or more objects and the target object and the groups, the assigned one of color and color group being closer to the one or more predetermined set of colors at a closer distance to the target object; and an object rendering module that graphically displays the one or more objects by using the colors assigned thereto.

2. The system of claim 1, further comprising:

an object grouping module that creates the one or more object groups from the one or more objects based on the attribute values of the objects when a number of objects is greater than an available number of colors; and a group mapping module that assigns a color group to each of the one or more object groups based on the distance between the target object and the one or more object groups.

3. The system of claim 1, wherein each object of the one or more objects represents an entity that is used in one or more computer programs and has one or more attributes, each object including a sell bid in an RFQ (request for quote) process.

4. The system of claim 1, wherein the one or more objects are sell bids which have one or more attributes including price, material quality and properties, color and size for product specification, delivery time and cost for service specification, and delivery experience and reputation for supplier qualification.

5. The system of claim 1, wherein the distance is a quantitative measure representing a degree of similarity or distinction between the one or more objects calculated by using the difference among attribute values of the objects.

6. The system of claim 1, wherein the distance calculator uses a distance formula:

$$D_i = \frac{\sum_j w_j |a_{i,j} - a_{t,j}|}{N_j}, \text{ and}$$

$D_i$ denotes a distance of the object i from the target object, $w_j$ represents a weight of the attribute j, $a_{ij}$ and $a_{tj}$ denote a value of the attribute j for the object i and the target object, respectively, and $N_j$ is a normalization factor for the attribute j.

7. The system of claim 1, wherein the distance is based on the attribute values of the one or more objects.

8. A method of using colors to graphically represent objects having multiple attributes in a computer comprising the steps of:

providing one or more objects each having attribute values, creating one or more color groups from one or more available graphical elements;

calculating distances among the one or more objects and a target object and distances among two or more object groups based on the attribute values of the objects;

assigning one of the one or more color groups to the one or more objects based on the calculated distances;

assigning a color from the assigned color group to the one or more objects based on the distance between the one or more objects and the target object, the assigned color being closer to a predetermined color of the target object at a closer distance to the target object; and graphically displaying the one or more objects by using the colors assigned thereto.

9. The method of claim 8, further comprising the steps of:

creating one or more object groups out of the one or more objects based on the attribute values of the objects when a number of objects exceeds a number of available colors;

calculating distances among the one or more object groups and the target object; and assigning one of the one or more color groups to the one or more object groups based on the distance.

10. The method of claim 9, wherein the distance is based on the attribute values of the one or more object groups.

11. The method of claim 8, wherein the distance is based on attribute values of the one or more objects.

12. The method of claim 8, wherein the distance is a quantitative measure representing a degree of similarity or distinction between the one or more objects calculated by using the difference among attribute values of the objects.

13. A machine readable medium containing code for using colors to graphically represent objects having multiple attributes in a computer, the code implementing the steps of:

providing one or more objects each having attribute values;

creating one or more color groups from one or more available graphical elements;

calculating distances among the one or more objects and a target object and distances among two or more object groups based on the attribute values of the objects;

assigning one of the one or more color groups to the one or more objects based on the calculated distances;

assigning a color from the assigned color group to the one or more objects based on the distance between the one or more objects and the target object, the assigned color being closer to a predetermined color of the target object at a closer distance to the target object; and graphically displaying the one or more objects by using the colors assigned thereto.

14. The system of claim 1, further comprising a group mapping module that assigns a color group to each of the one or more object groups based on the distance between the target object and the one or more object groups.

15. The system of claim 13, wherein the graphical elements include at least one of a color, a pattern, and a texture.

16. The method of claim 1, further comprising a group mapping module to select a color group for mapping to the one or more objects based on attribute values of the objects represented by the distances calculated by the distance calculator.

17. The method of claim 1, further comprising an element mapping module to assign a color to the one or more objects based on the attribute values of the one or more objects within an assigned color group.

18. The method of claim 1, further comprising an object grouping module to create the two or more object groups from the one or more objects based on attribute values of the objects represented by a distance value.

19. The method of claim 8, further comprising a graphic grouping module to create the color groups from the one or more graphical elements based on characteristics of the two or more object groups.

* * * * *